July 1, 1930.  J. S. TALMAGE  1,769,400
PRUNING SAW
Filed April 23, 1928
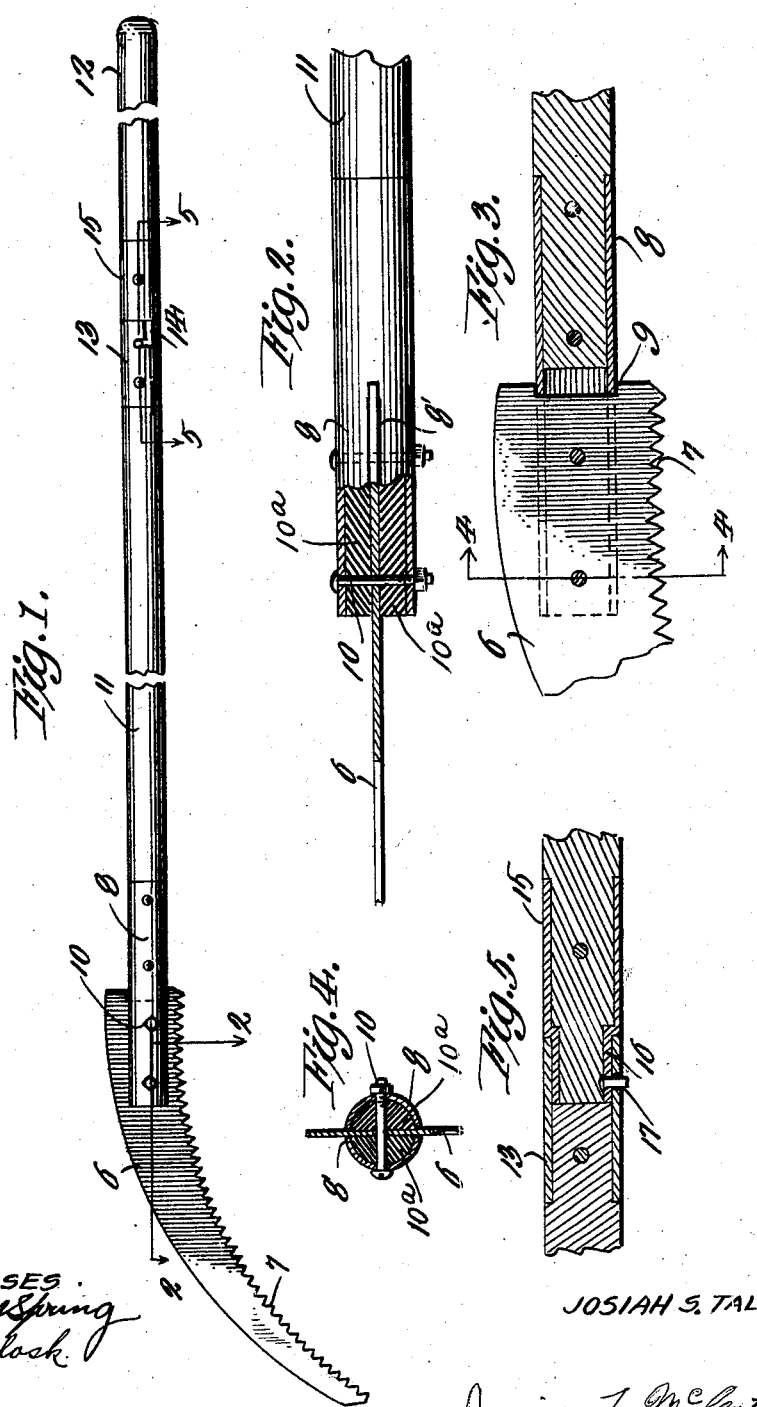
Inventor
JOSIAH S. TALMAGE
By Irving L. McCathern
Attorney Patented July 1, 1930

1,769,400

UNITED STATES PATENT OFFICE

JOSIAH S. TALMAGE, OF PINECASTLE, FLORIDA

PRUNING SAW

Application filed April 23, 1928. Serial No. 272,337.

This invention relates to improvements in saws, and more particularly to an implement known as a pruning saw.

An important object of the invention is to provide a saw of the above character which can be readily employed for trimming branches or the like from trees.

A further object of the invention is to provide a pruning saw which is formed so as to readily permit severance of limbs positioned substantially high in trees.

A still further object of the invention is to provide a saw of the above mentioned character which may be employed for pruning objects out of the normal reach of the operator.

Other objects and advantages of this invention will be apparent during the course of the following description.

In the accompanying drawing forming a part of this specification and in which like numerals are employed to designate corresponding parts throughout the same:

Figure 1 is a side elevation of the device embodying my invention,

Figure 2 is an enlarged sectional view taken on the line 2—2 of Figure 1,

Figure 3 is an enlarged detail view illustrating the manner of connecting the saw blade, Figure 4 is a transverse sectional view taken on the line 4—4 of Figure 3, and Figure 5 is a longitudinal sectional view taken on the line 5—5 of Figure 1.

In the drawing, wherein for the purpose of illustration is shown the preferred embodiment of my invention, the numeral 6 generally indicates the blade of my improved saw substantially convexo-concave in configuration and provided on the inner edge with teeth 7. It is desirable that the saw blade 6 be of tapered formation substantially wider at the rear or connecting end, than at the front or outer free end, so as to permit secure engagement with a connecting sleeve 8. This sleeve 8 is provided with a pair of oppositely disposed longitudinally slots 8' extending substantially one-half the length thereof for the reception of the saw blade. As clearly shown in Figure 3 the rear end of the saw blade is provided with a recess 9 to permit a close fitting connection. The saw blade 6 and connecting sleeve 8 are securely fastened by means of transversely extending bolts 10 extending through suitable openings formed in the sleeve and saw and secured by suitable nuts. The bottom wall of the recess 9 contacts with the end walls of the slots 8', and the end walls of the recess contact with the upper and lower sides of the sleeve 8. The engagement thus established between the saw blade 6 and the sleeve 8, together with the filler blocks $10^a$ arranged within the sleeve at opposite sides of the saw blade and secured in place by the bolts 10, produces a substantial connection between the saw blade and sleeve and prevents undue strain on the bolts when the saw blade is in use.

The opposite extension of the sleeve 8 engages the reduced extremity of a handle section 11 comprising the upper handle section and secured to the sleeve 8 by suitable bolts or screws for operation of the saw blade. The opposite extremity of the section is reduced for the reception of a fitting to be hereinafter more fully described. A lower handle member or extension 12 is engageable with the upper section to permit convenient operation of the implement when used for trimming objects disposed high above the ground.

In order to removably connect the handle sections 11 and 12 suitable connecting means are provided. This is accomplished by the provision of a connector sleeve 13 mounted on the lower reduced portion of the section 11 and connected thereto by a suitable screw or bolt. This section is preferably fitted flush with the body of the upper section and is provided with an angular slot 14 connecting with the lower edge thereof. A companion sleeve 15, provided with a reduced upper extension 16, is suitably fitted on the upper end of the lower handle section 12 by a bolt or in any suitable manner. Carried by the companion sleeve 15 and projecting radially from the side thereof is a connecting pin 17 being of suitable diameter to freely engage the angular slot 14 and lock the connecting sleeve in position.

From the foregoing construction it is readily seen that the upper and lower handle sections may be readily disconnected to permit convenient transportation of the device. In use, the handle sections are operatively connected by means of telescoping the connector sleeve and rotating the lower handle section to properly secure the guide pin 17 within the transverse extension of the slot 14. In this manner the sections provide a continuous handle rod of practically rigid construction for expedient use of the saw blade. The blade is positioned adjacent the limb it is desired to sever and the rod composed of the handle sections moved vertically in an up and down motion. The serrated or toothed edge will then saw the limb in a clean and even manner.

It is obvious that this construction provides a device which may be readily operated for sawing tree limbs without great effort. When necessary additional sections suitably provided with end connections may be secured intermediate the upper section 11 and the handle section 12 enabling the operator to reach the higher branches of the tree.

It is to be understood that the form of my invention herewith shown and described is to be taken as the preferred example of the same and that various changes as to the shape, size and arrangement of parts may be resorted to without departing from the spirit of the invention, or the scope of the subjoined claim.

Having thus described my invention, I claim:

A pruning saw comprising a handle, a sleeve secured to and extending beyond the front end of the handle, the extended portion of the sleeve being provided with diametrically opposed and longitudinally extending slots, a saw blade having its rear end portion arranged within the extended portion of the sleeve and extending radially beyond the sleeve through said slots, the rear end of the saw blade being provided with a recess having its inner walls contacting with the rear end walls of the slots and having its end walls contacting with the upper and lower sides of the sleeve for producing overlying portions engaging the outer sides of the sleeves and assisting in holding the blade against swinging movement with respect to the handle, filler blocks arranged within the extended portion of the sleeve at opposite sides of the saw blades and snugly engaging the sides of said blade, and a retaining element passing through the extended portion of the sleeve, filler blocks and saw blade.

In testimony whereof I affix my signature.

JOSIAH S. TALMAGE.